US009757806B2

(12) United States Patent
Naito et al.

(10) Patent No.: US 9,757,806 B2
(45) Date of Patent: Sep. 12, 2017

(54) HAND-HELD CUTTING TOOLS

(71) Applicant: Makita Corporation, Anjo-shi, Aichi (JP)

(72) Inventors: Tsutomu Naito, Anjo (JP); Hirotomo Inayoshi, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 13/650,428

(22) Filed: Oct. 12, 2012

(65) Prior Publication Data

US 2013/0097878 A1 Apr. 25, 2013

(30) Foreign Application Priority Data

Oct. 20, 2011 (JP) ................................ 2011-230429
Sep. 26, 2012 (JP) ................................ 2012-212325

(51) Int. Cl.
*B23D 47/12* (2006.01)
*B27B 9/00* (2006.01)

(52) U.S. Cl.
CPC ................ *B23D 47/12* (2013.01); *B27B 9/00* (2013.01)

(58) Field of Classification Search
CPC .... B27B 9/00; B27B 9/02; B27B 9/04; B27B 17/0083; B27B 11/04; B23S 47/12; B23S 47/123; B23S 47/126
USPC ................... 30/370, 371, 374–377, 388, 391
See application file for complete search history.

(56) References Cited

U.S. PATENT DOCUMENTS 1,497,067 A 6/1924 Casey
2,504,880 A * 4/1950 Rittenhouse ................. 408/124
3,513,888 A * 5/1970 Welsh et al. .................... 30/390
4,555,849 A * 12/1985 Ando et al. ..................... 30/388
4,589,208 A 5/1986 Iwasaki et al.
4,847,513 A * 7/1989 Katz et al. .................... 307/149
5,856,715 A * 1/1999 Peot et al. ...................... 310/50
6,161,293 A * 12/2000 Watson .......................... 30/377
6,570,284 B1 * 5/2003 Agnes .................... H02K 1/185 310/156.01
6,819,022 B2 * 11/2004 Yamamoto ............ H02K 29/08 310/156.05
6,996,909 B1 * 2/2006 Buck et al. ..................... 30/388
7,429,430 B2 * 9/2008 Mooty et al. ................ 429/100
(Continued)

FOREIGN PATENT DOCUMENTS

CN 102632293 A 8/2012
EP 0 752 240 A1 1/1997
(Continued)

OTHER PUBLICATIONS

Extended Search Report issued in European Patent Application No. 12188802.8 dated Jan. 22, 2013.
Aug. 22, 2014 Office Action issued in Chinese Application No. 2012104009947 (with English translation).
May 2, 2016 Search Report issued in European Patent Application No. 12188802.8.
(Continued)

*Primary Examiner* — Jason Daniel Prone
*Assistant Examiner* — Richard Crosby, Jr.
(74) *Attorney, Agent, or Firm* — Oliff PLC

(57) ABSTRACT

A hand-held cutting tool may include a handle and a battery pack. The handle has a rear portion with respect to a work proceeding direction along which the cutting tool is moved for performing a cutting operation. When the battery pack is mounted to the rear portion of the handle, the longitudinal direction of the battery pack extends non-parallel with the work proceeding direction.

23 Claims, 13 Drawing Sheets

(56) References Cited

U.S. PATENT DOCUMENTS

| | | | | |
|---|---|---|---|---|
| RE40,848 | E * | 7/2009 | Pitzen et al. | 429/100 |
| 7,581,323 | B2 * | 9/2009 | Miklosz et al. | 30/388 |
| 7,858,219 | B2 * | 12/2010 | Agehara et al. | 429/97 |
| 8,513,838 | B2 * | 8/2013 | Toukairin | B25F 5/008 310/50 |
| 8,667,694 | B2 * | 3/2014 | Tokunaga | B23D 47/12 30/166.3 |
| 8,935,857 | B2 * | 1/2015 | Inayoshi | B23D 45/16 30/388 |
| 2001/0029819 | A1 * | 10/2001 | Okouchi | 83/13 |
| 2003/0037445 | A1 * | 2/2003 | Fey et al. | 30/388 |
| 2004/0060178 | A1 * | 4/2004 | Willer | B27G 19/04 30/391 |
| 2004/0117990 | A1 * | 6/2004 | Bohne | B23D 59/006 30/124 |
| 2006/0112569 | A1 | 6/2006 | Baxivanelis et al. | |
| 2011/0167651 | A1 * | 7/2011 | Tokunaga et al. | 30/388 |
| 2012/0066916 | A1 * | 3/2012 | Heinzelmann | B23Q 11/14 30/381 |
| 2012/0198708 | A1 | 8/2012 | Naito et al. | |
| 2013/0097878 | A1 | 4/2013 | Naito et al. | |

FOREIGN PATENT DOCUMENTS

| | | | |
|---|---|---|---|
| EP | 0979711 | A2 | 2/2000 |
| EP | 0979711 | A3 | 12/2003 |
| JP | A-58-222803 | | 12/1983 |
| JP | A-58-222804 | | 12/1983 |
| JP | A-59-167201 | | 9/1984 |
| JP | A-61-8289 | | 1/1986 |
| JP | A-2008-018498 | | 1/2008 |
| JP | A-2009-90393 | | 4/2009 |
| JP | A-2009-274407 | | 11/2009 |
| JP | A-2010-201598 | | 9/2010 |
| JP | 2014-079812 | A | 5/2014 |
| WO | WO 2011/110189 | A1 | 9/2011 |

OTHER PUBLICATIONS

Dec. 20, 2016 Office Action issued in Japanese Patent Application No. 2016-152848.

Feb. 7, 2017 Office Action issued in Japanese Patent Application No. 2016-152848.

* cited by examiner

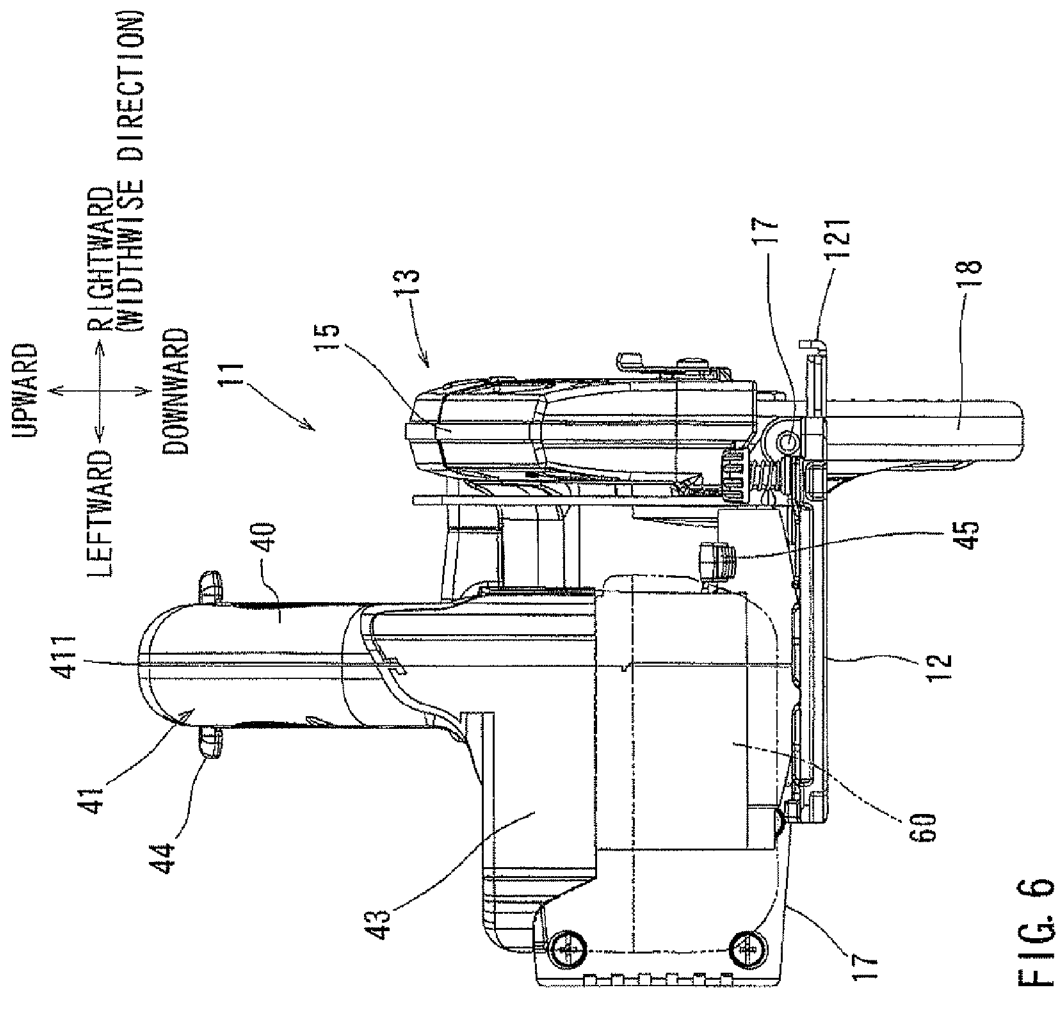
FIG. 6
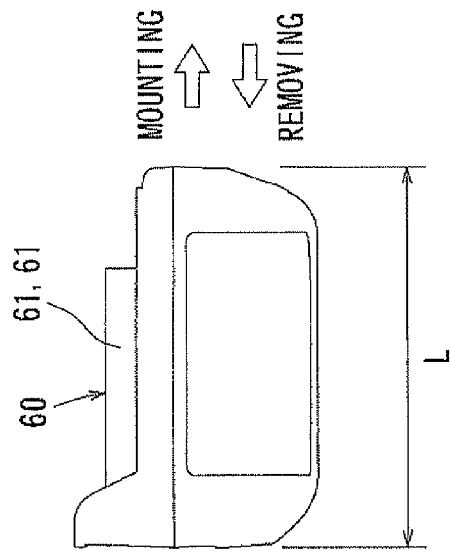

HAND-HELD CUTTING TOOLS

This application claims priority to Japanese patent application serial number 2011-230429 and 2012-212325, the contents of which are incorporated herein by reference.

BACKGROUND OF THE INVENTION

Field of the Invention

Embodiments of the present invention relate to cutting tools, in particular to hand-held cutting tools having batteries as power sources.

Description of the Related Art

JP-A-2010-201598, JP-A-2008-18498 and JP-A-61-8289 disclose known cutting tools. Each of these documents discloses a portable circular saw having a base for contacting with an upper surface of a workpiece, and a tool unit supported on the base. The tool unit includes a circular saw blade, an electric motor for rotating the circular saw blade, and a handle that can be grasped by the user for moving the circular saw.

As disclosed in the above documents, a battery may be typically mounted to the rear portion of the handle or a position adjacent to the rear portion. The battery may be removed from the handle for recharging by a battery charger that may be provided separately from the circular saw. In general, the battery has a battery case and a plurality of battery cells received within the battery case. This type of battery is called "battery pack." In recent years, lithium-ion battery cells have been used as battery cells of the battery. The above documents teach techniques of improving the weight balance of the circular saw by mounting the battery pack to the rear portion of the handle as nearer to the front side of the handle as possible.

In this kind of hand-held cutting tool having a battery pack, the battery pack may be mounted to and removed from a battery mount portion provided at a rear portion of the handle by moving the battery pack to slide in forward and rearward directions (that may be a cut proceeding direction and a direction opposite to the cut proceeding direction) along the battery mount portion. Typically, the battery pack has a substantially rectangular parallelepiped shape and has slide rails. The slide rails may be provided on an upper surface of the battery pack to extend in the longitudinal direction. Therefore, the battery pack may be mounted to the rear portion of the handle in the state that the longitudinal direction of the battery pack extends along the cut proceeding direction. As a result, it is necessary for the rear portion of the handle to have a large size in the forward and rearward direction, resulting in degradation in the weight balance and also in the operability.

Therefore, there has been a need in the art for hand-held cutting tools that are improved in operability.

SUMMARY OF THE INVENTION

In one aspect according to the present teachings, a hand-held cutting tool may include a handle and a battery pack. The handle has a rear portion with respect to a work proceeding direction along which the cutting tool is moved for performing a cutting operation. When the battery pack is mounted to the rear portion of the handle, the longitudinal direction of the battery pack extends non-parallel with the work proceeding direction.

BRIEF DESCRIPTION OF THE DRAWINGS

FIG. 6 is a rear view of the cutting tool showing the state where the battery pack is removed;

DETAILED DESCRIPTION OF THE INVENTION

Figure 1:
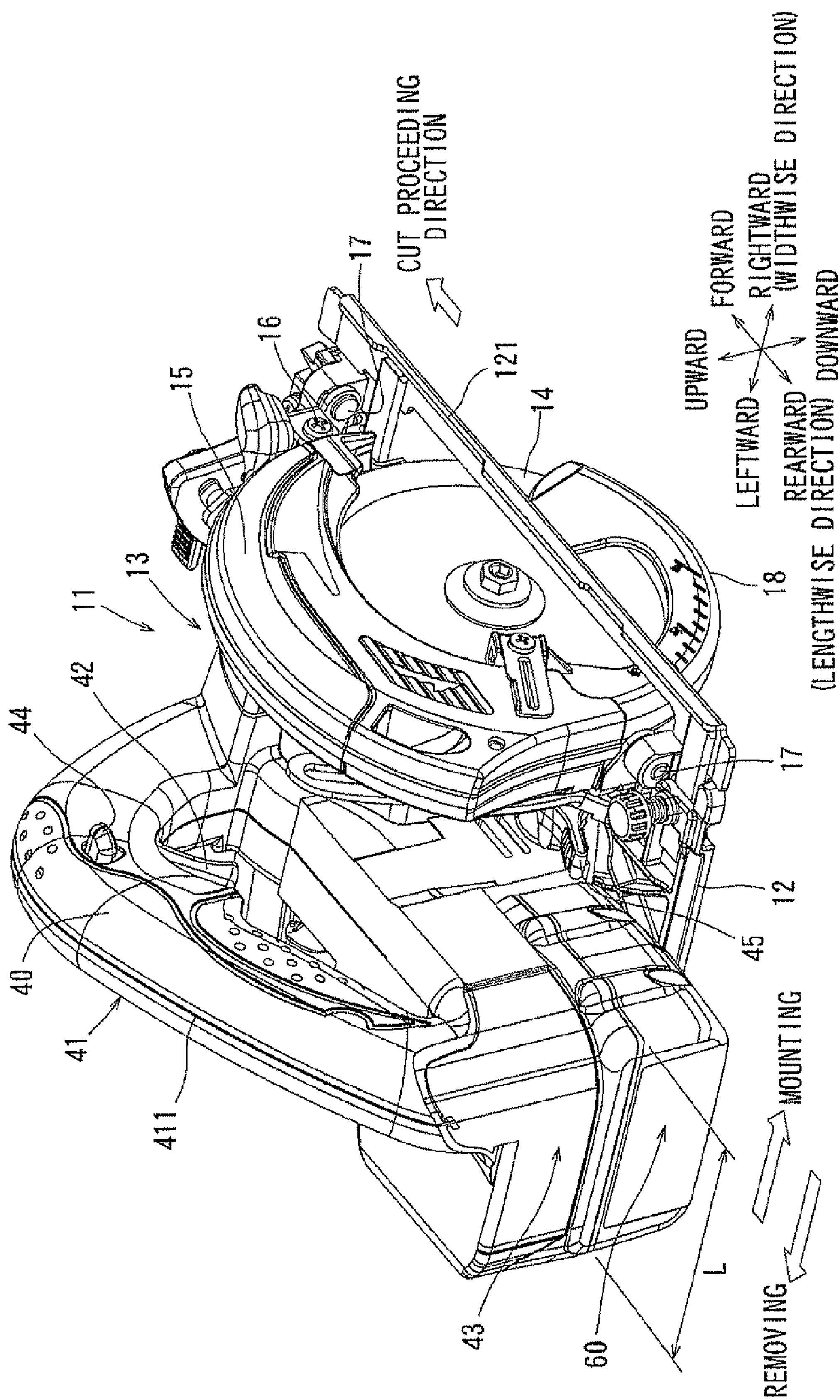
FIG. 1 is a perspective view of a cutting tool according to a first embodiment as viewed from a direction diagonally rearward and right side.

Each of the additional features and teachings disclosed above and below may be utilized separately or in conjunction with other features and teachings to provide improved cutting tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one embodiment, a hand-held cutting tool may include a tool unit including a handle and a battery pack. A user may grasp the handle. The battery pack may serve as a power source. The battery pack may be configured to be mounted to the handle and may have a longitudinal direction. The handle may have a rear portion with respect to a work proceeding direction, along which the cutting tool is moved for performing a cutting operation, such as a cutting operation. When the battery pack is mounted to the rear portion of the handle, the longitudinal direction of the battery pack may extend in a first direction that is non-parallel with the work proceeding direction. For example, the first direction may be substantially perpendicular to the cut proceeding direction.

The battery pack may have a rectangular parallelepiped shape that is typical in battery packs used for cutting tools. Therefore, the widthwise direction of the battery pack may extend in the forward and rearward direction of the handle (i.e., the cut proceeding direction) when the battery pack is mounted to the rear portion of the handle. Because the width of the battery pack may be smaller than the length, it is possible to reduce the size of the rear portion of the handle with respect to the forward and rearward direction. This may enable the center of gravity of the battery pack to be positioned forwardly with respect to the handle in comparison with the arrangement in which the battery pack is mounted to the handle such that its longitudinal direction extends along the forward and rearward direction of the handle. In this way, the balance in weight of the cutting tool can be improved. As a result, the operability of the cutting tool can be improved.

The battery pack may be mounted to and removed from the rear portion of the handle by slidably moving the battery pack in a second direction along a lower portion of the rear portion of the handle. The second direction may be non-parallel with the work proceeding direction. For example, the second direction may be substantially perpendicular to the work proceeding direction.

The hand-held cutting tool may be a portable circular saw and may include a base that can be placed on a workpiece. The tool unit may be supported on the base and may further include a drive section located upwardly of the base. The handle may be disposed on an upper side of the drive section. The drive section may include an electric motor configured to rotate by an electric power supplied from the battery pack, a first rotary shaft serving as an output shaft of the electric motor, a motor gear rotatable with the first rotary shaft, a first reduction gear engaging with the motor gear, a second rotary shaft rotatable with the first reduction gear, a second reduction gear engaging with the first reduction gear, and a third rotary shaft rotatable with the second reduction gear.

The first rotary shaft and the third rotary shaft may be located within a range of a length of the handle with respect to the work proceeding direction. With this arrangement, the length with respect to the work proceeding direction of the cutting unit including the handle and the drive section can be reduced. Therefore, the cutting tool can be downsized. In this way, it is possible to further improve the operability of the cutting tool.

The first rotary shaft and the third rotary shaft may be positioned forwardly of a center of gravity of the battery pack when the battery pack is mounted to the handle.

With this arrangement, it is possible to further improve the balance in weight of the cutting tool with respect to the forward and rearward direction. Also in this respect, it is possible to further improve the operability of the cutting tool.

The second rotary shaft may be positioned forwardly of both of the first rotary shaft and the third rotary shaft with respect to the work proceeding direction. A slip-preventing cover may cover the outer surface of the handle. The slip-preventing cover may have a front end with respect to the cut proceeding direction. The second rotary shaft may be positioned rearwardly of the front end of the slip-preventing cover with respect to the work proceeding direction. Also with this arrangement, it is possible to further improve the balance in weight of the cutting tool with respect to the forward and rearward direction. In this way, it is possible to further improve the operability of the cutting tool.

A first embodiment will now be described with reference to FIGS. 1 to 6. Referring to FIGS. 1 to 6, there is shown a cutting tool 11 known as a circular saw, as an example of a hand-held cutting tool. The cutting tool 11 may generally include a substantially rectangular base 12 and a tool unit 13 that may be supported on the upper surface of the base 12. The base 12 is designed for contacting with an upper surface of a workpiece (not shown). A sub-base 121 may be detachably mounted to a right side of the base 12. The sub-base 121 may be provided for convenience of performing a so-called "edge cutting operation." For the purpose of explanation, a work proceeding direction (i.e., a cut proceeding direction) that is a direction, along which the cutting tool 11 is moved for performing a cutting operation, will be determined as a forward direction.

The tool unit 13 may include a circular saw blade 14 and a blade case 15. The blade case 15 may cover substantially the upper circumferential half of the saw blade 14. An electric motor 19 (see FIGS. 3 and 4) may be mounted to the backside surface (left side surface) of the blade case 15 via a reduction gear section 30. The circular saw blade 14 serves as a cutting tool in this embodiment. The motor 19 and the reduction gear section 30 may constitute a drive section 20.

The lower portion of the saw blade 14 may protrude downward though the base 12. The downwardly protruding lower portion of the saw blade 14 may cut into the workpiece during a cutting operation. A movable cover 18 may cover the lower portion of the saw blade 14. The movable cover 18 may be rotatably supported by the blade case 15.

The tool unit 13 may be vertically pivotally supported by the base 12 via a pivot shaft 16 that is mounted to the front portion of the upper surface of the base 12. The downwardly protruding distance of the saw blade 14 from the lower surface of the base 12 may correspond to a cutting depth of the saw blade 14 into the workpiece. In this embodiment, the cutting depth can be adjusted by changing the pivoted position of the tool unit 13 about the pivot shaft 16 relative to the base 12.

A cutting depth fixing lever 45 operable for fixing the vertically pivoted position of the tool unit 13 may be positioned on the backside of the blade case 15 and on the rear side of the reduction gear section 30.

The tool unit 13 may be laterally pivotally supported by the base 12 via front and rear lateral pivot shafts 17. The front and rear lateral pivot shafts 17 may have the same axis and may be mounted to the upper surface of the base 12.

The tool unit 13 may further include a handle 41 that can be grasped by one of both hands of the user. The handle 41 may extend rearward from the upper portion of the reduction gear section 30 in a manner like an angle. The handle 41 may include left and right handle halves that are joined together at a joint plane 411 to form a handle housing 40 that has a hollow structure. A trigger-type switch lever 42 may be mounted to the lower side of the handle 41. The user can push the switch lever 42 by finger(s) of his or her one hand while the user can grasp the handle 41 with the same hand. When the switch lever 42 is pushed, the electric motor 19 may start to rotate the saw blade 14. A lock-off lever 44 may be mounted within the handle 41 to extend outward from opposite lateral sides of the handle 41. The lock-off lever 44 may be operable for locking the switch lever 42 at an on-lock position.

A battery mount portion 43 may be provided at the lower part of the rear portion of the handle 41. A battery pack 60 that serves as a power source of the cutting tool 11 may be mounted to the lower side of the battery mount portion 43. More specifically, the battery pack 60 can be mounted to and removed from the battery mount portion 43 by moving the battery pack 60 to slide rightward and leftward along the battery mount portion 43.

Figure 5:
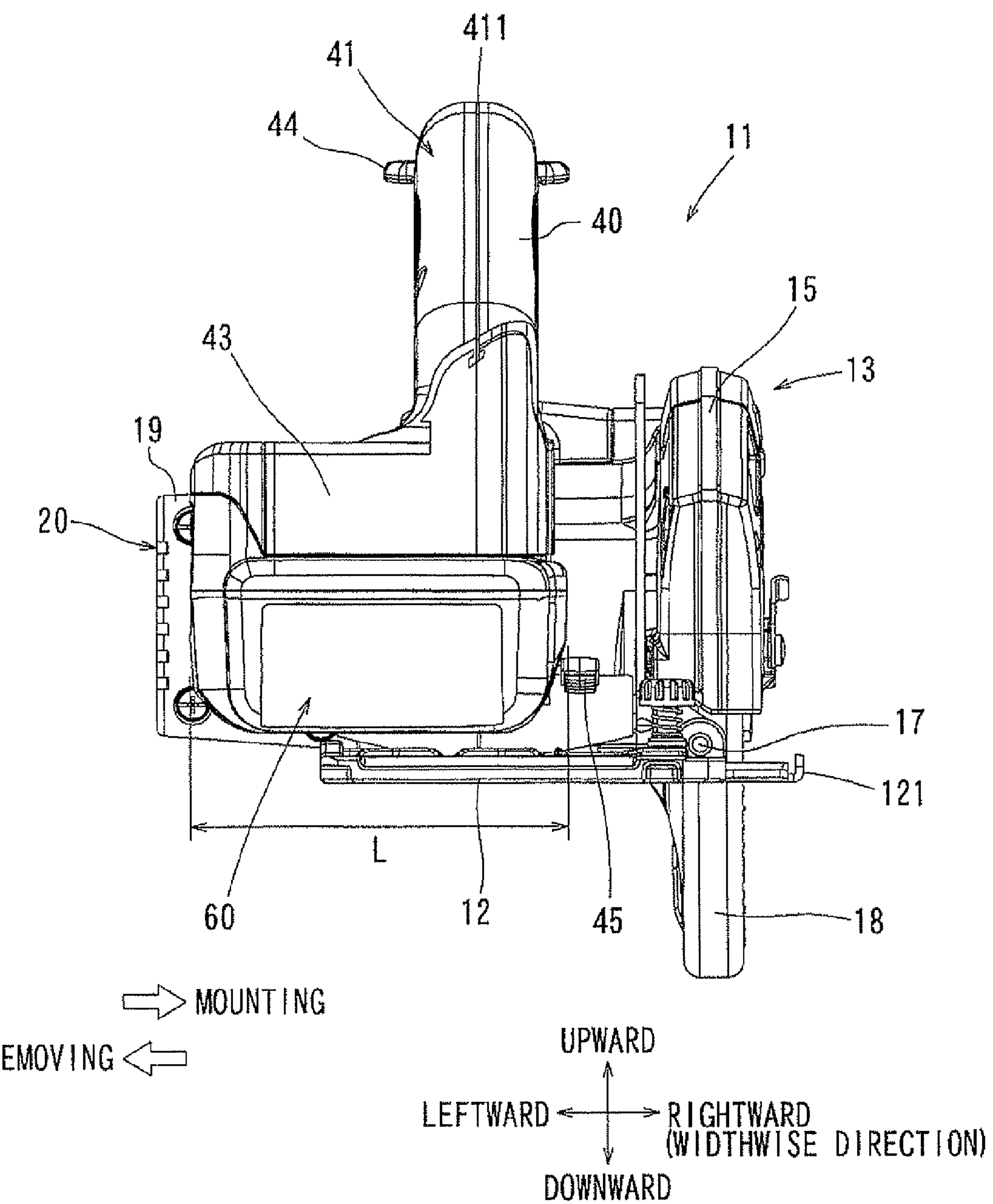
FIG. 5 is a rear view of the cutting tool showing the state where the battery pack is mounted.

Thus, the battery pack 60 can be mounted to the battery mount portion 43 by moving the battery pack 60 to slide rightward along the battery mount portion 43 as shown in FIG. 5. On the other hand, the battery pack 60 can be removed from the battery mount portion 43 by moving the battery pack 60 to slide leftward along the battery mount portion 43 as shown in FIG. 6.

Figure 2:
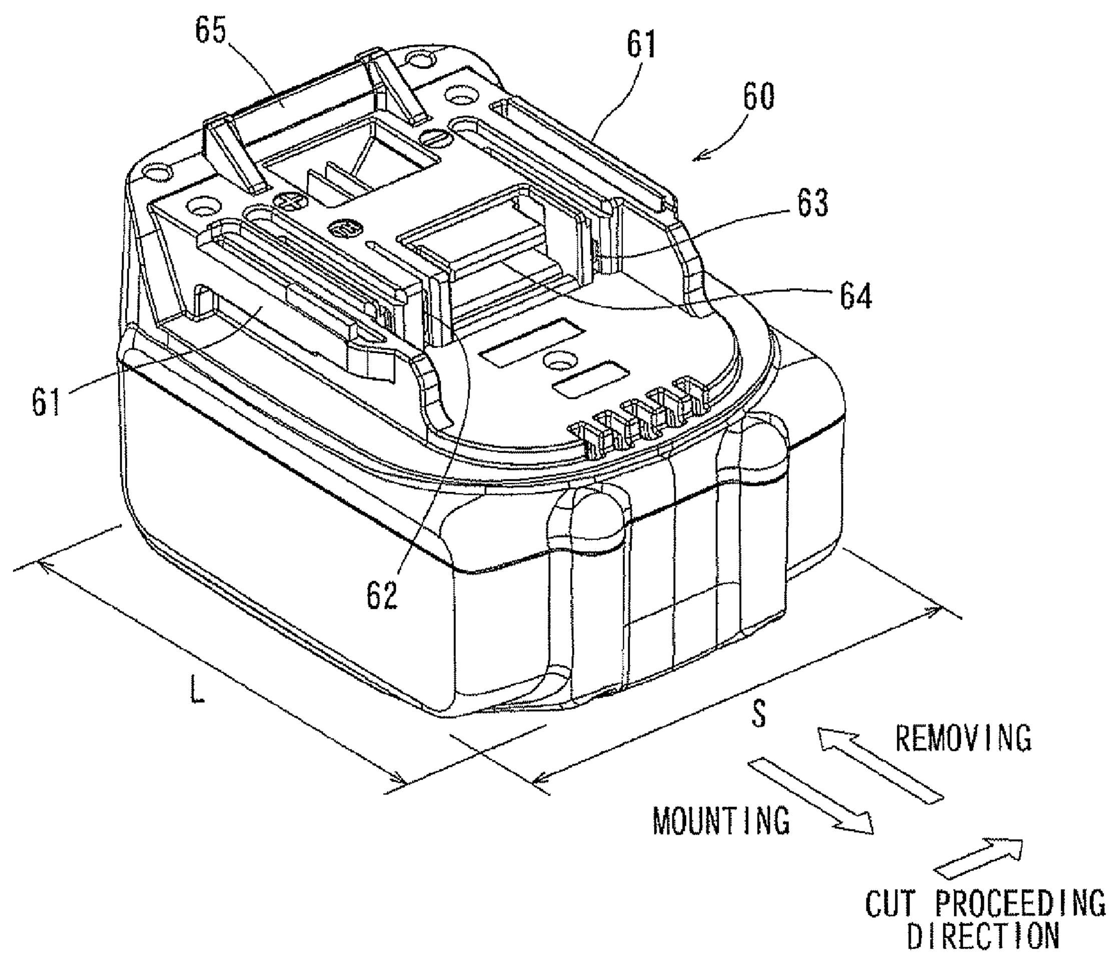
FIG. 2 is a perspective view of a battery pack.
Figure 3:
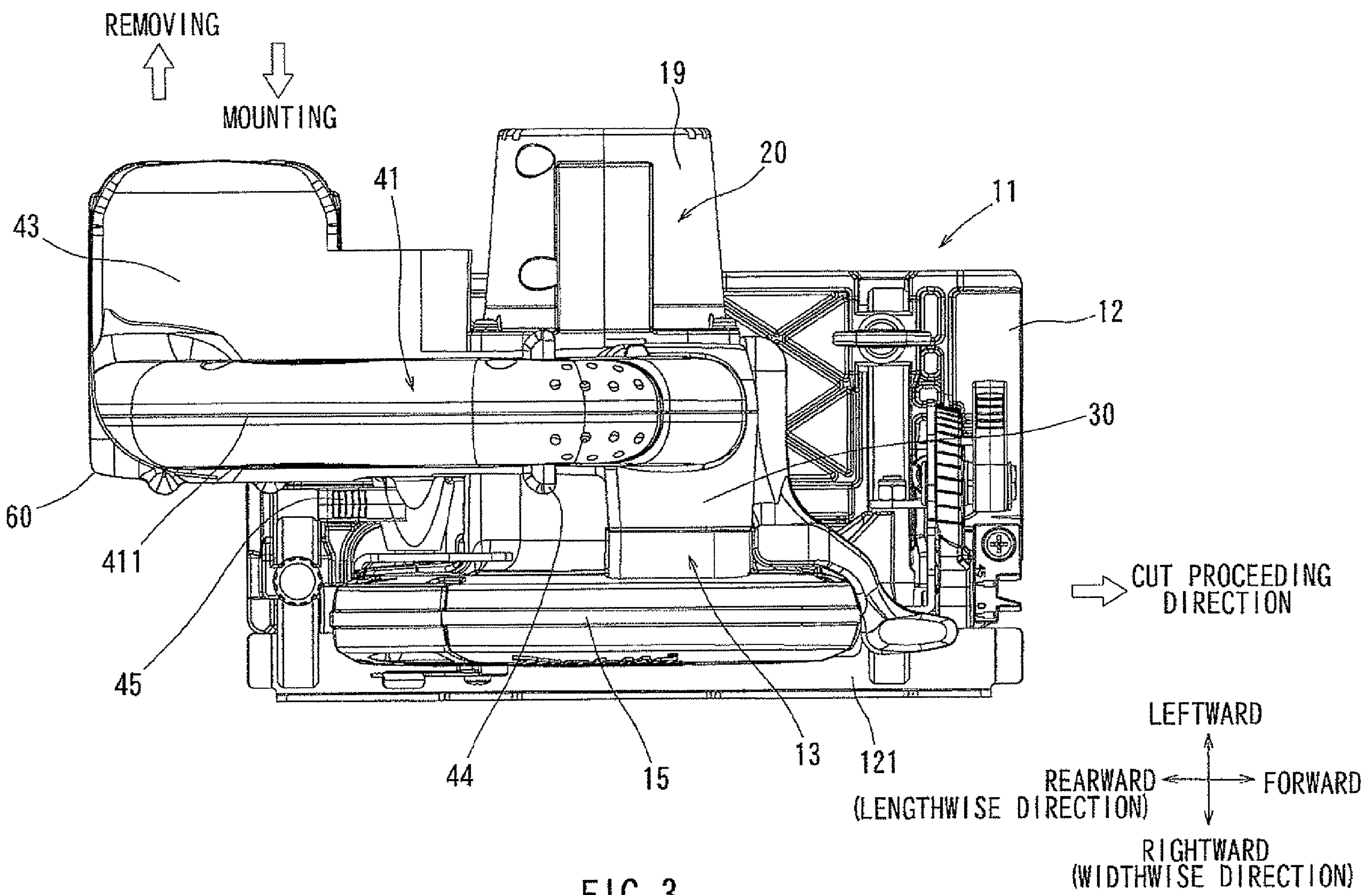
FIG. 3 a plan view of the cutting tool.
Figure 4:
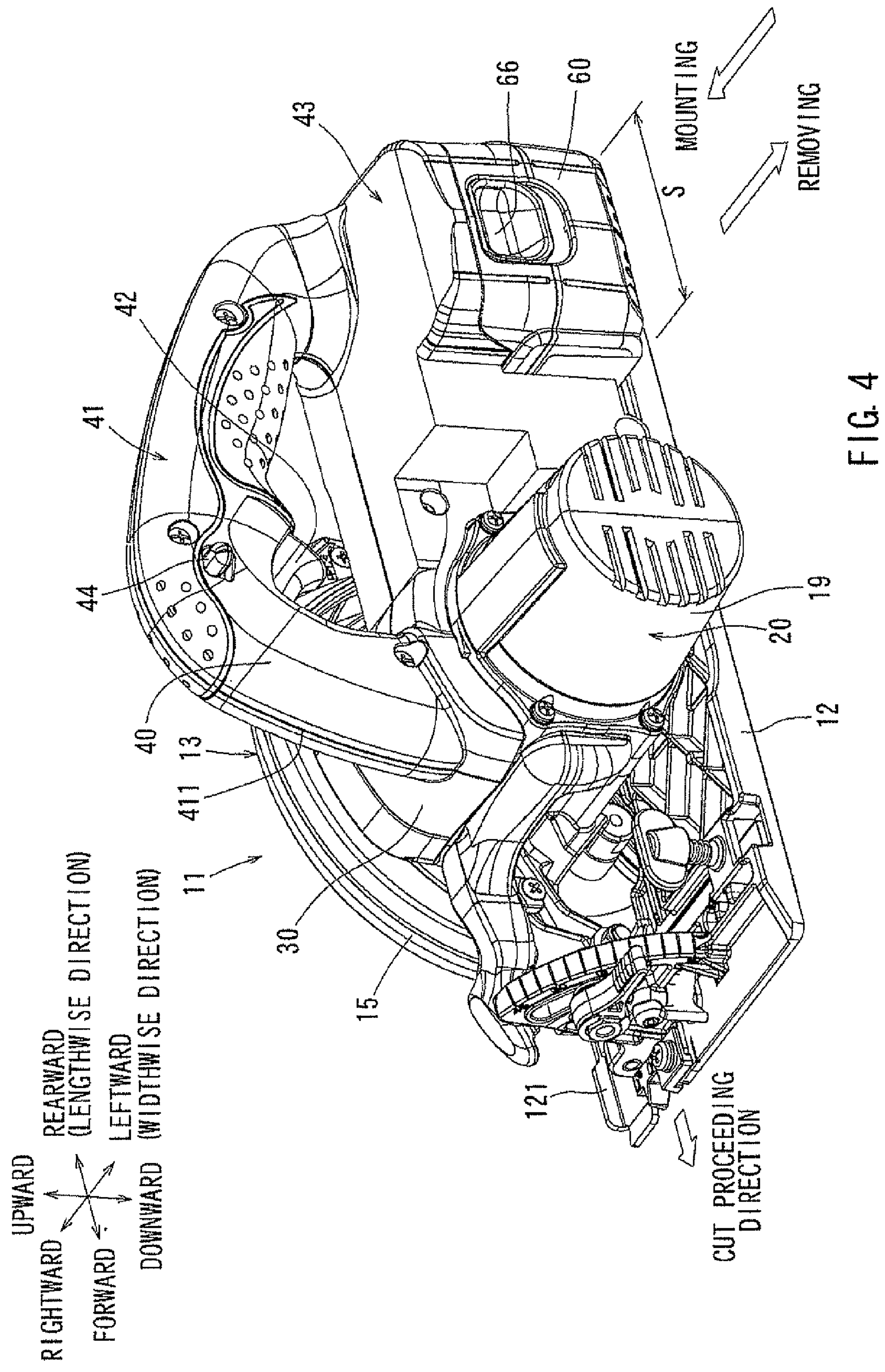
FIG. 4 is a perspective view of the cutting tool as viewed from a direction diagonally rearward and left side.

The battery pack 60 may be a lithium-ion battery pack having a plurality of lithium-ion battery cells disposed within a battery case. For example, the battery pack 60 may have an output voltage of 14.4V. A separately provided battery charger (not shown) can charge the battery pack 60. Therefore, the battery pack 60 can be repeatedly used. As shown in FIG. 2, the battery pack 60 has a substantially rectangular parallelepiped shape and has a length L and a width S that is smaller than the length L. In the following description, a direction along the length L will be referred to as a lengthwise direction L, and a direction along the width S will be referred to as a widthwise direction S.

A pair of slide rails 61 may be provided on the upper surface of the battery pack 60 and may extend along the lengthwise direction L in parallel to each other. The battery pack 60 can be mounted to and removed from the battery mount portion 43 as the battery pack 60 is moved to slide along the battery mount portion 43 via the pair of rails 61.

Therefore, in this embodiment, the lengthwise direction L of the battery pack 60 substantially parallel to a mounting and removing direction (sliding direction) of the battery pack 60. The mounting and removing direction may be the left and right direction (lateral direction) with respect to the cutting tool 11. The left and right direction may be substantially perpendicular to the work proceeding direction and also may be substantially perpendicular to the joint plane 411 of the handle halves of the handle 41. Also, the mounting and removing direction may be a left and right direction as viewed from the side of the user who grasps the handle 41 for operating the cutting tool 11. Therefore, in the state where the battery pack 60 is mounted to the battery mount portion 43, the widthwise direction S of the battery pack 60 may be substantially parallel to the extending direction of the handle 41 and may extend substantially along the forward and rearward direction with respect to the cutting tool 11.

The battery pack 60 may have a positive terminal 62, a negative terminal 63 and a signal connector 64. The signal connector 64 may be provided for transmitting a control signal. The positive terminal 62, the negative terminal 63 and the signal connector 64 may be positioned between the rails 61. The positive terminal 62 and the negative terminal 63 may be provided for connection with corresponding terminals provided at the battery mount portion 43. Similarly, the signal connector 64 may be provided for connection with a corresponding connector provided at the battery mount portion 43. When the battery pack 60 is slid laterally along the battery mount portion 43 to reach a mount position, the positive terminal 62, the negative terminal 63 and the signal connector 64 may be electrically connected to the corresponding terminals and the corresponding connector of the battery mount portion 43. In other words, the battery pack 60 may be electrically connected to the battery mount portion 43 and eventually to the cutting tool 11.

The battery pack 60 may further include a lock claw 65 protruding upward from the upper surface of the battery pack 60. The lock claw 65 may lock the battery pack 60 against the battery mount portion 43 when the battery pack 60 has reached the mount position. A release button 66 (see FIG. 4) may be provided at an end surface in the removing direction of the battery pack 60. When the user pushes the release button 66, the lock claw 65 may move downwardly into the battery pack 60, so that the lock state by the lock claw 65 can be released.

With the cutting tool 11 of the above embodiment, the battery pack 60 can be mounted to and removed from the battery mount portion 43 at the rear portion of the handle 41 by moving the battery pack 60 to be slid along the battery mount portion 43 in the lateral direction (i.e., the direction substantially perpendicular to the cut proceeding direction). During the mounting and removing operations, the battery pack 60 is laterally oriented. Thus, the battery pack 60 is oriented such that the longitudinal direction L of the battery pack 60 is substantially perpendicular to the cut proceeding direction. Therefore, in the mounted state, the widthwise direction of the battery pack 60 extends substantially along the forward and rearward direction of the cutting tool 11.

For this reason, the cutting tool 11 may be compact in size in the forward and rearward direction of the battery mount portion 43 and eventually the rear portion of the handle 41 in comparison with the arrangement in which the battery pack is mounted to be oriented in the longitudinal direction. Therefore, the user who grasps the handle 41 can easily operate the cutting tool 11 for moving in the cutting direction.

In addition, because the battery pack 60 having a substantially rectangular parallelepiped shape is mounted in the state where its longitudinal direction L extends along the lateral direction (left and right direction), the center of gravity of the battery pack 60 can be positioned forwardly toward the switch lever 42 of the handle 41 in comparison with the arrangement in which the battery back is mounted to be oriented in the longitudinal direction. Therefore, it is possible to improve the balance in weight of the cutting tool 11 when the user holds the cutting tool 11 by grasping the handle 41. Hence, the cutting tool 11 can be easily operated also in this respect.

A second embodiment will now be described with reference to FIGS. 7 to 14. FIGS. 7 to 14 show a hand-held cutting tool 11A according to the second embodiment. Also, the cutting tool 11A is configured as a portable circular saw. The cutting tool 11A of this embodiment is different from the cutting tool 11 of the first embodiment mainly in the construction of a handle 41A. Therefore, in FIGS. 7 to 14, like members are given the same reference numerals as the first embodiment and the description of these members will not be repeated or will be made in brief.

In the second embodiment, members that are similar to those of the first embodiment but are somewhat different from them in configurations are labeled with the same reference numerals with symbol "A" affixed thereto. Also, the cutting tool 11A of the second embodiment will be described with the determination that a work proceeding direction (cut proceeding direction) is a forward direction.

Also in this second embodiment, the battery pack 60 is used as a power source and the cutting tool 11A includes a cutting unit 13A that has the handle 41A. Similar to the first embodiment, the cutting tool 11A includes the base 12 for contacting with an upper surface of a workpiece. The cutting unit 13A may be supported on the base 12. The cutting unit 13A may include the drive section 20 positioned on the upper side of the base 12. The handle 41A may be mounted to the upper side of the drive section 20. The handle 41A may include a handle housing 40A having a hollow structure.

Figure 7:
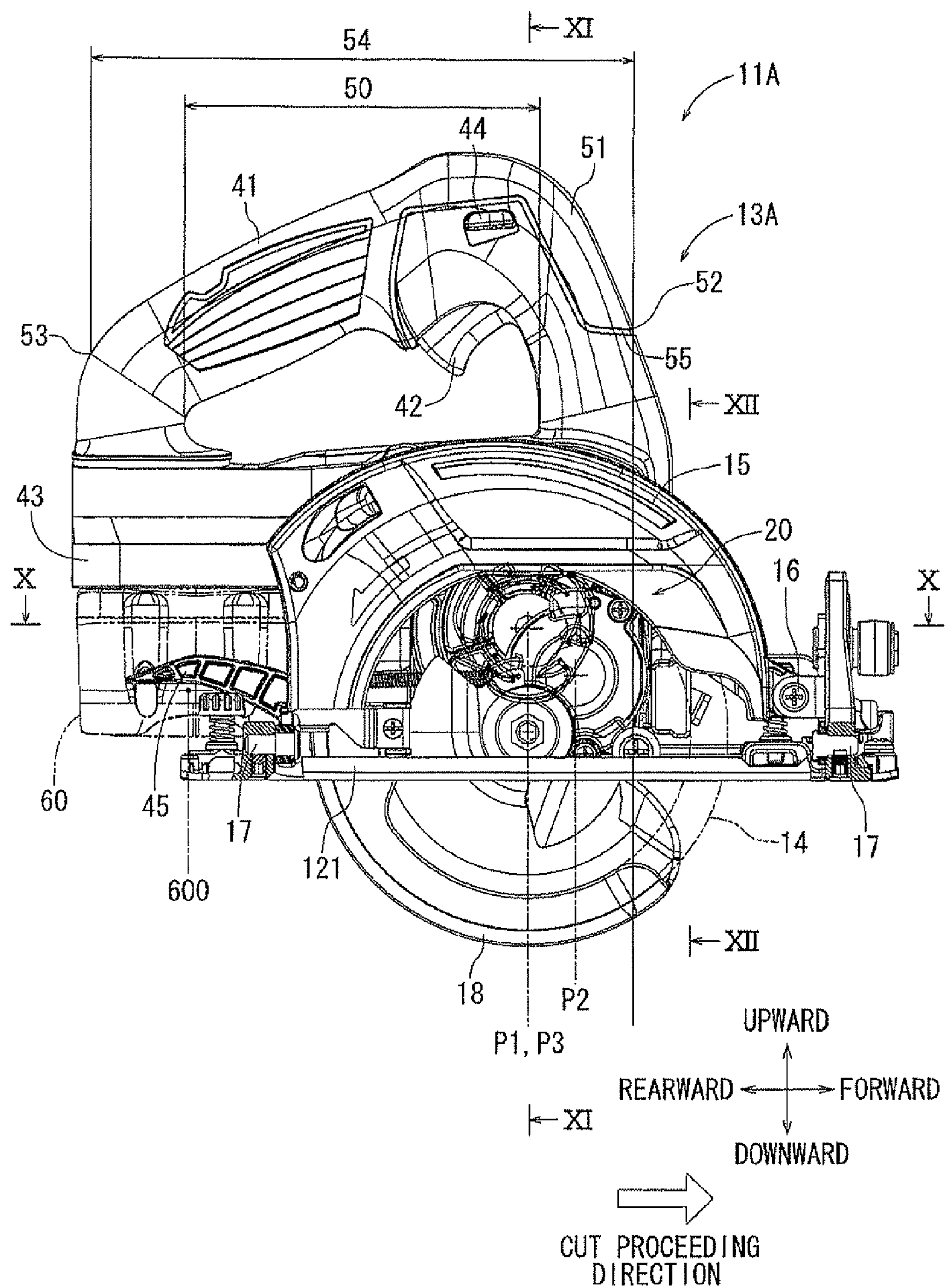
FIG. 7 is a right side view of a cutting tool according to a second embodiment.

The handle housing 40A may be molded by synthetic resin. As shown in FIG. 7, a handle space having a length 50 in the forward and rearward direction may be formed on the lower side of the handle 41A for enabling the user to insert his or her fingers for grasping the handle 41A. In the following explanation, the space having the length 50 will be also referred to as the handle space 50.

As shown in FIG. 7, a portion of an outer surface of the handle 41A may be covered with a slip-preventing cover 51, so that the hand of the user may contact the slip-preventing cover 51 when the user grasps the handle 41A. The slip-preventing cover 51 may be formed, for example, of thermoplastic elastomer (TPE) in order to effectively prevent slippage of the hand of the user. Therefore, the slip-preventing cover 51 may be provided to cover only a portion of the outer surface of the handle 41A. Thus, the slip-preventing cover 51 may cover a portion of the outer surface, which is preferable to have a slip-preventing function. Preferably, the slip-preventing cover 51 may be molded integrally with the handle 41A. In FIG. 7, the reference numeral 54 designates the length of the slip-preventing cover 51 in the forward and rearward direction. As shown in FIG. 7, the length 54 extends both forwardly and rearwardly from the length 50 of the handle space. Thus, a front end 52 of the slip-preventing cover 51 is positioned forwardly of the front end of the handle space 50, and a rear end 53 of the slip-preventing cover 51 is positioned rearwardly of the rear end of the handle space 50. In this way, the length 54 of the slip-preventing cover 51 is set to be longer than the length 50 of the handle space. A recess 55 may be formed in the outer surface of the handle 41A along the edge of the front portion including the front end 52 of the slip-preventing cover 51, so that the front portion of the slip-preventing cover 51 is delimited from the directly exposed outer surface of the handle 41A by the recess 55. Any other synthetic resin than thermoplastic elastomer (TPE) may be used for forming the slip-preventing cover 51.

The drive section 20 may include the electric motor 19 and the reduction gear section 30. The electric motor 19 may be a brush-less motor and may rotate with a supply of electric power from the battery pack 60. The electric motor 19 may include a stator 22 and a rotor 23. The rotor 24 may include permanent magnets. The stator 22 may receive a supply of electric power from the battery pack 60 and may generate a magnetic flux that may cause rotation of the rotor 23. A motor shaft 24 may be integrated with the rotor 23 and may serve as an output shaft of the motor 19. The motor shaft 24 may be rotatably supported by bearings 25 and 26. The bearing 25 may be mounted within a motor housing 21, and the bearing 26 may be mounted within the blade case 15. In this embodiment, both of the bearings 25 and 26 are ball bearings. A cooling fan 27 and a pinion gear 28 may be mounted to the motor shaft 24 so as to rotate together with the motor shaft 24. The pinion gear 28 may serve as a motor gear. The cooling fan 27 may be a centrifugal fan. As the cooling fan 27 rotates, the cooling fan 27 may produce air streams W (see FIG. 10) flowing from the outside into the tool unit 13A via inlet holes 47 (see FIG. 8) formed in the motor housing 21. Therefore, the stator 22, which may generate heat, may be cooled. After cooling the stator 22, the air streams W may flow toward inside of the blade case 15 and may be thereafter discharged to the outside. The pinion gear 28 may be formed integrally with the motor shaft 24 and may engage an intermediate drive gear 31 that will be explained later, so that the rotation of the motor shaft 24 may be transmitted to the reduction gear section 30.

The reduction gear section 30 may include a reduction gear train that may include a plurality of spur gears for reducing the rotation of the motor shaft 24. In this embodiment, the reduction gear train includes three spur gears. More specifically, the reduction gear train includes the intermediate drive gear 31, an intermediate driven gear 321 and an output gear 35 that engages the intermediate driven gear 321. The intermediate drive gear 31 and the intermediate driven gear 321 may be supported on an intermediate shaft 32 and may rotate together with the intermediate shaft 32. The intermediate shaft 32 may be rotatably supported by bearings 33 and 34 that are mounted within a gear housing 301 of the reduction gear section 30, which may be formed integrally with the handle housing 40A. Both of the bearings 33 and 34 may be ball bearings. The output gear 35 may be supported on an output shaft 36 and may rotate together with the output shaft 36. The output shaft 36 may be rotatably supported by bearings 37 and 38 that are also mounted within the gear housing 301. The right end of the output shaft 36 may extend into the blade case 15. A blade holder 39 may be provided on the right end portion of the output shaft 36 for holding the saw blade 14. The blade holder 39 may be a clamp device for clamping the saw blade 14. In this way, the rotation of the electric motor 19 may be reduced at two stages by the intermediate drive gear 31 and the output gear 35 before it is transmitted to the output shaft 36. Thus, in the reduction gear train, the motor shaft 24 serves as a first rotary shaft, the pinion gear 28 serves as a motor gear, the intermediate drive gear 31 serves as a first reduction gear engaging with the motor gear, the intermediate shaft 32 serves as a second rotary shaft rotatable with the first reduction gear, the intermediate driven gear 321 serves as a second reduction gear rotatable with the second rotary shaft, the output gear 35 serves a third reduction gear engaging with the second reduction gear, and the output shaft 36 serves as a third rotary shaft rotatable with the third reduction gear.

Figure 11:
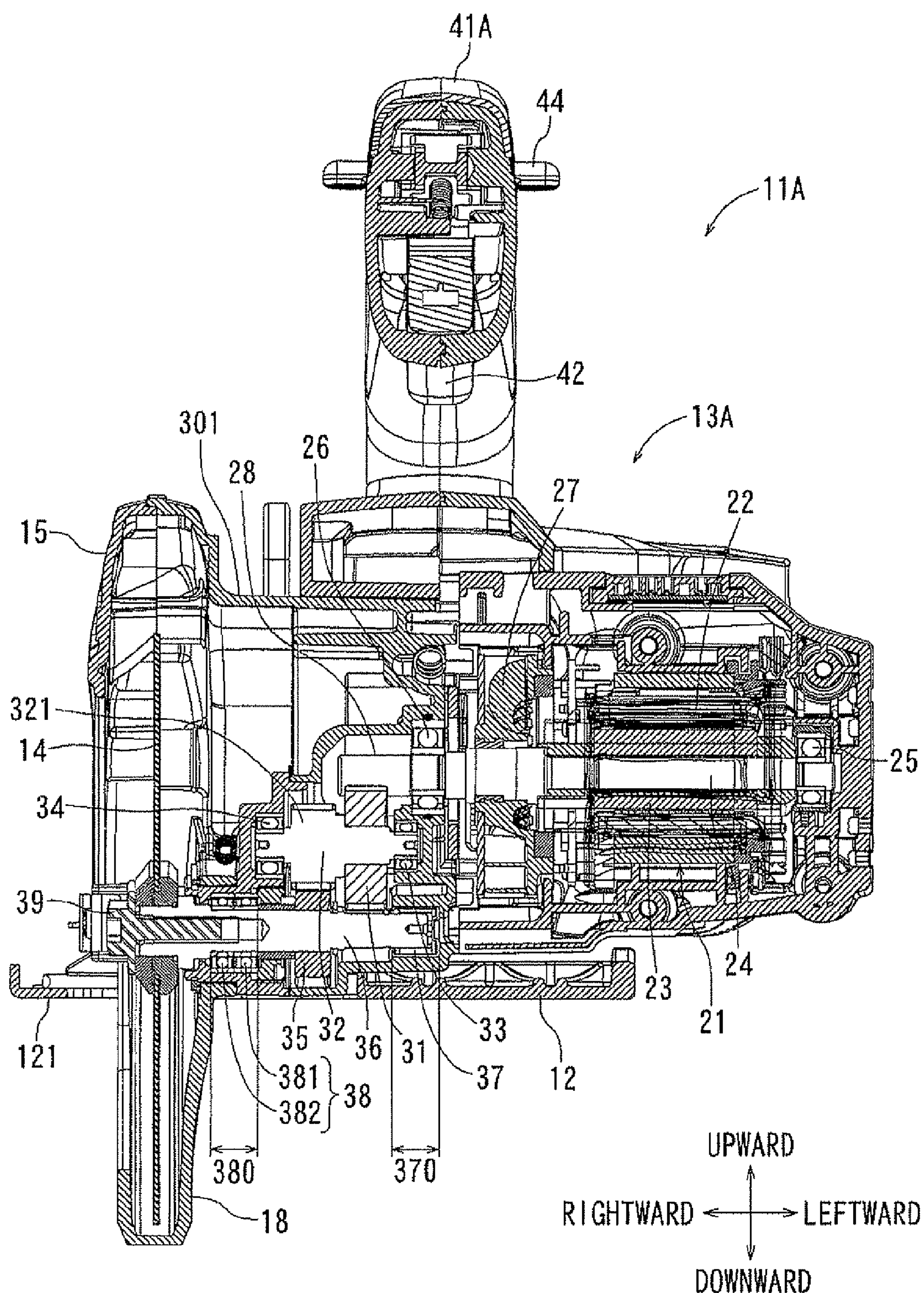
FIG. 11 is a sectional view taken along line XI-XI in FIG. 7.
Figure 12:
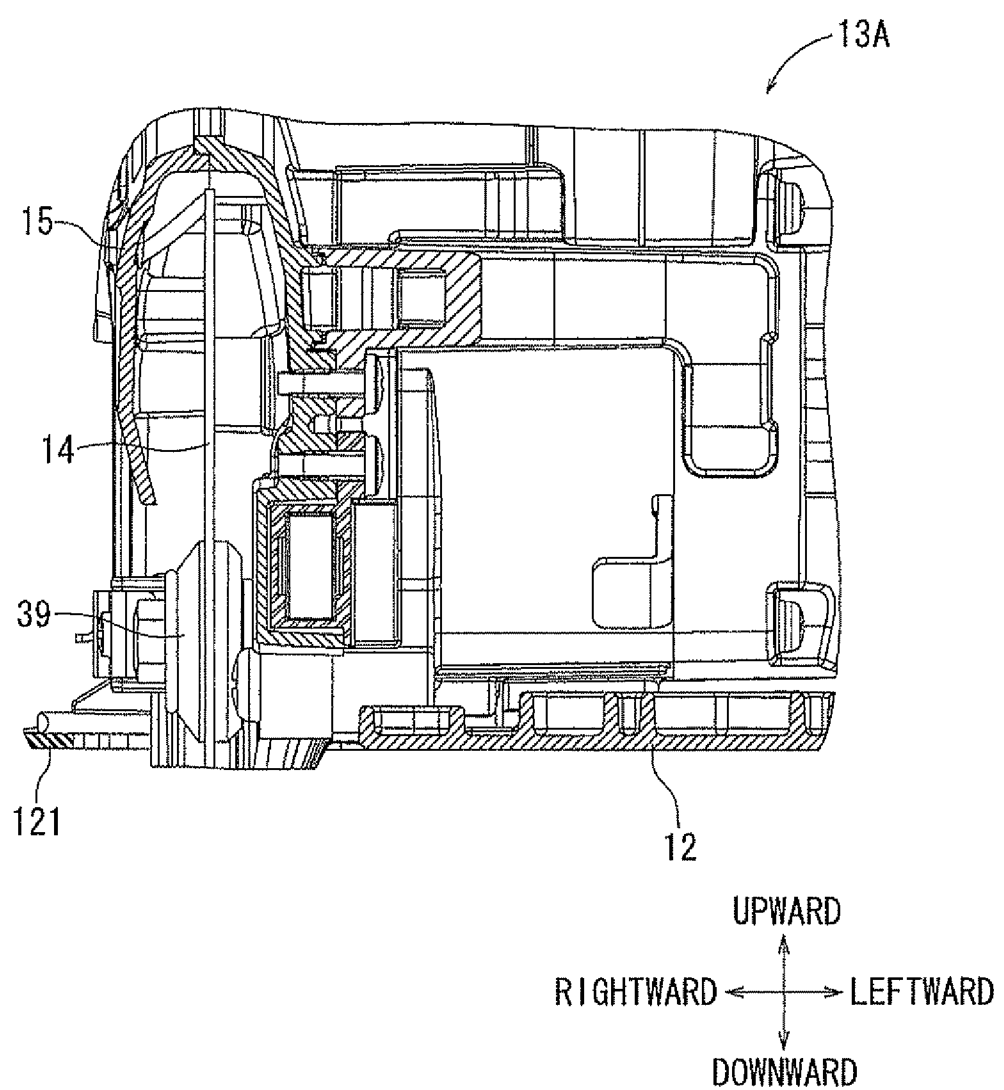
FIG. 12 is a sectional view taken along line XII-XII in FIG. 7.
Figure 13:
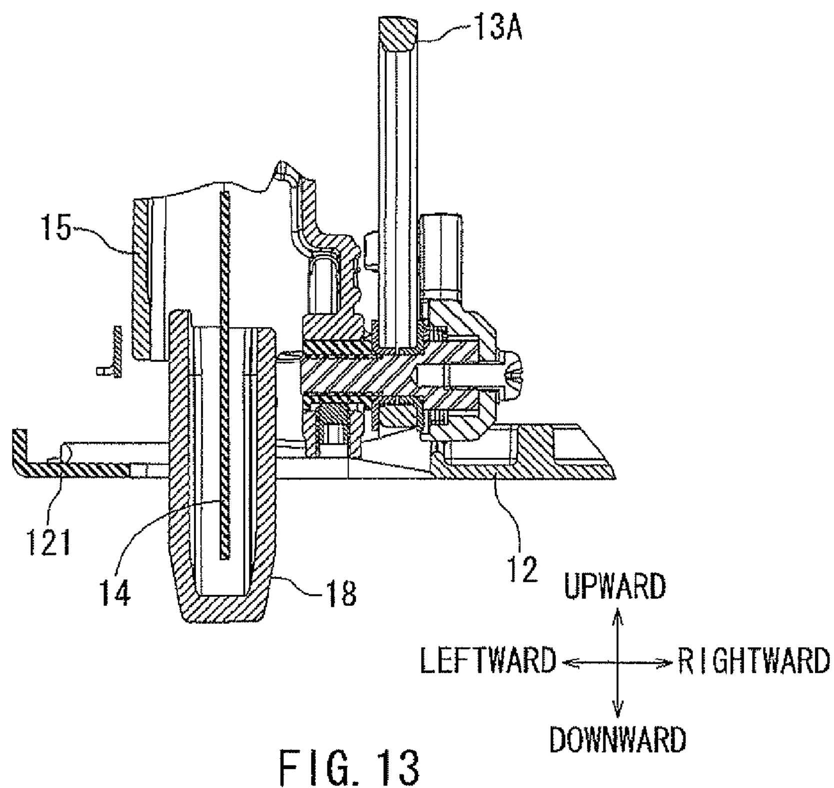
FIG. 13 is a sectional view taken along line XIII-XIII in FIG. 9.
Figure 14:
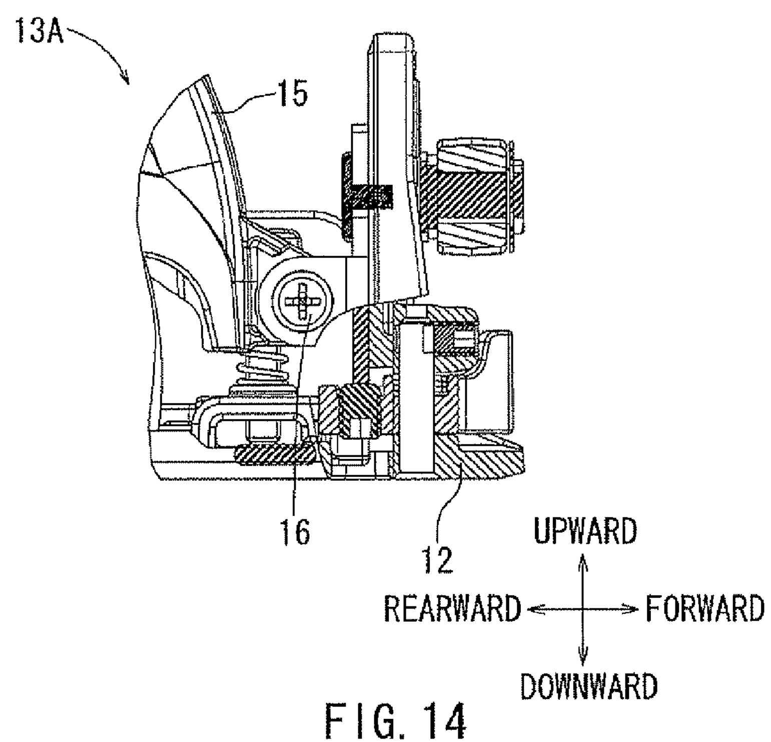
FIG. 14 is a sectional view taken along line XIV-XIV in FIG. 9.

As shown in FIG. 11, the bearing 37 may support the left side portion (inner side portion) of the output shaft 36 on the side of the electric motor 19. The bearing 38 may support the right side portion (outer side portion) of the output shaft 36 on the side of the blade case 15. In this embodiment, the bearing 37 is a needle bearing. The bearing 38 may include two ball bearings 381 and 382 that are arranged adjacent to each other in the axial direction of the output shaft 36. In this way, the output shaft 36 may be supported by three bearings including the bearing 37, which is a single needle bearing, and two ball bearings 381 and 382. As explained above, these bearings 37, 381 and 382 may be mounted within the gear housing 301. Although two bearings 381 and 382 are used for supporting the right side portion of the output shaft 36, a contact length 380 in the axial direction of these bearings 381 and 382 contacting with the output shaft 36 may be set to be slightly longer than a contact length 370 in the axial direction of the bearing 37 contacting with the output shaft 36 (see FIG. 11). Therefore, the contact length 380 or the total axial length of two bearings 381 and 382 may be substantially equal to or longer the contact length 370 of the bearing 37.

The positional relationship between the motor shaft 24, the intermediate shaft 32 and the output shaft 36 within the tool unit 13A with respect to the forward and rearward direction along the work proceeding direction will now be described. As shown in FIG. 7, a position P1 of the motor shaft 24 in the forward and rearward direction may be set so as to be within a range of the length 50 of the space of the handle 41A. As explained previously, this space allows the user to insert his or her fingers. Also, a position P3 of the output shaft 36 in the forward and rearward direction may be set so as to be within a range of the length 50. In this example, the motor shaft 24 and the output shaft 36 are spaced from each other in the vertical direction but are positioned at the same position in the forward and rearward direction. Therefore, the position P1 and the position P3 are the same. Hence, the position P1 and P3 may be positioned within the range of the length of the handle 41A in the forward and rearward direction of the tool unit 13A. More specifically, in this embodiment, the positions P1 and P3 are set to be forwardly of a position 600. The position 600 may be a position of the center of gravity of the battery pack 60 in the forward and rearward direction. As described in the first embodiment, the battery pack 60 may be mounted to the battery mount portion 43.

A position P2 of the intermediate shaft 32 in the forward and rearward direction may be set to be forwardly of the positions P1 and P2. In addition, the position P2 may be set to be forwardly of the front end of the range of the length 50 of the space of the handle 41A. Further, the position P2 may be set to be rearwardly of the front end 52 of the slip-preventing cover 51 of the handle 51A. More specifically, the position P2 may be set at a substantially middle position between the front end 52 of the slip-preventing cover 51 and the position P1 or P3. The vertical position of the intermediate shaft 32 may be set at a substantially middle position between the motor shaft 24 and the output shaft 36.

Figure 8:
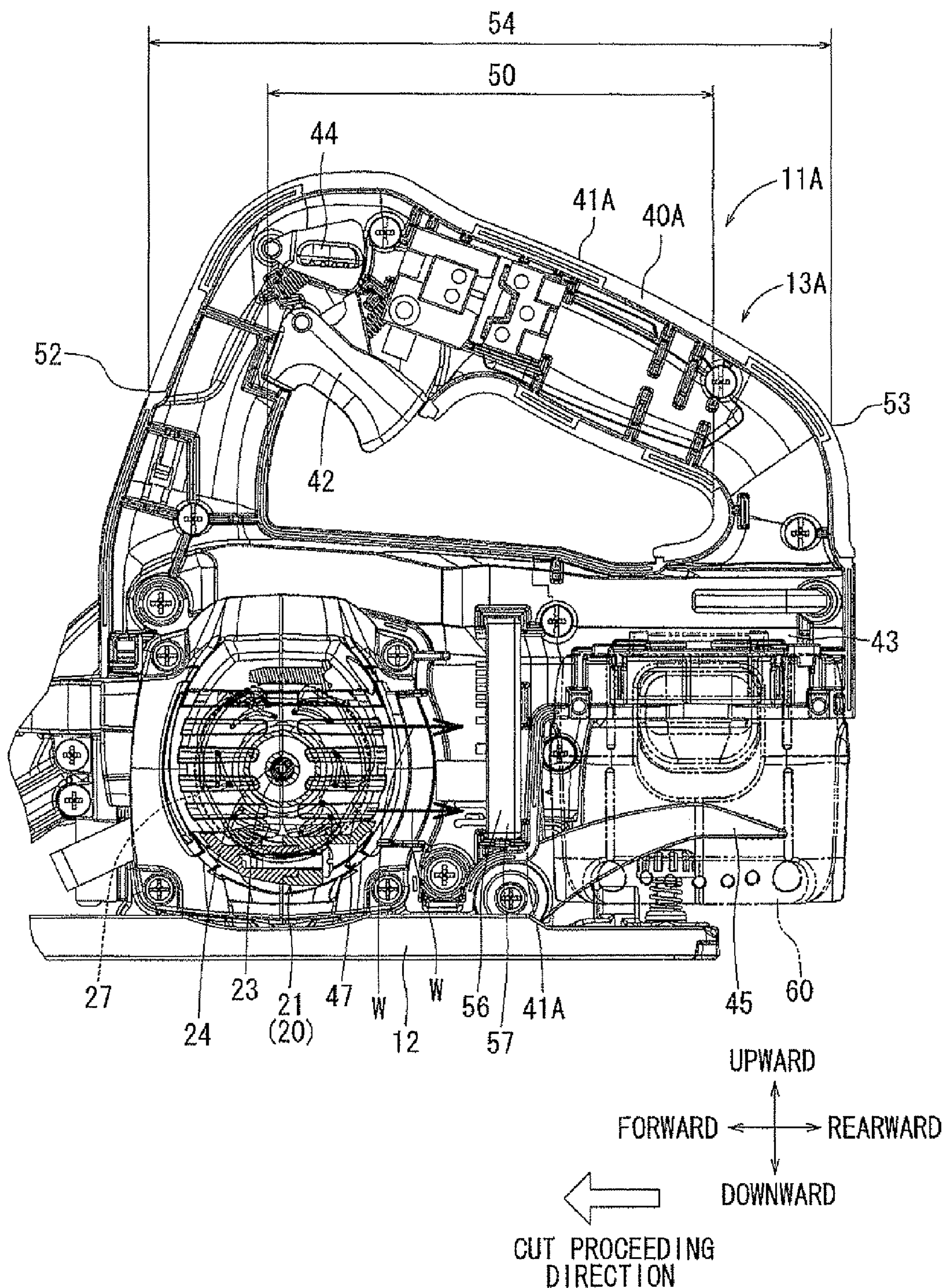
FIG. 8 is a left side view of the cutting tool shown in FIG. 7.
Figure 9:
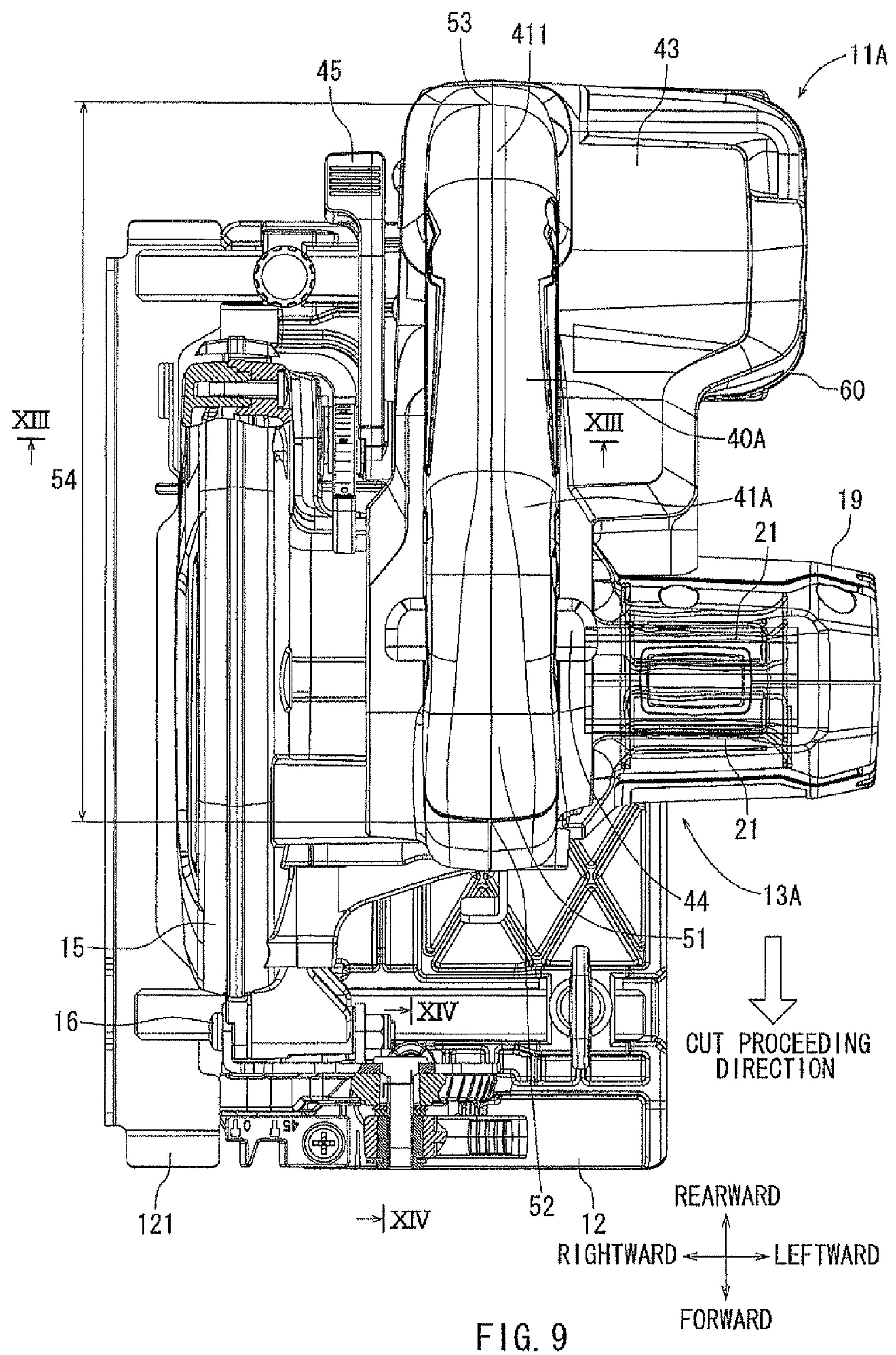
FIG. 9 is a plan view of the cutting tool shown in FIG. 7.
Figure 10:
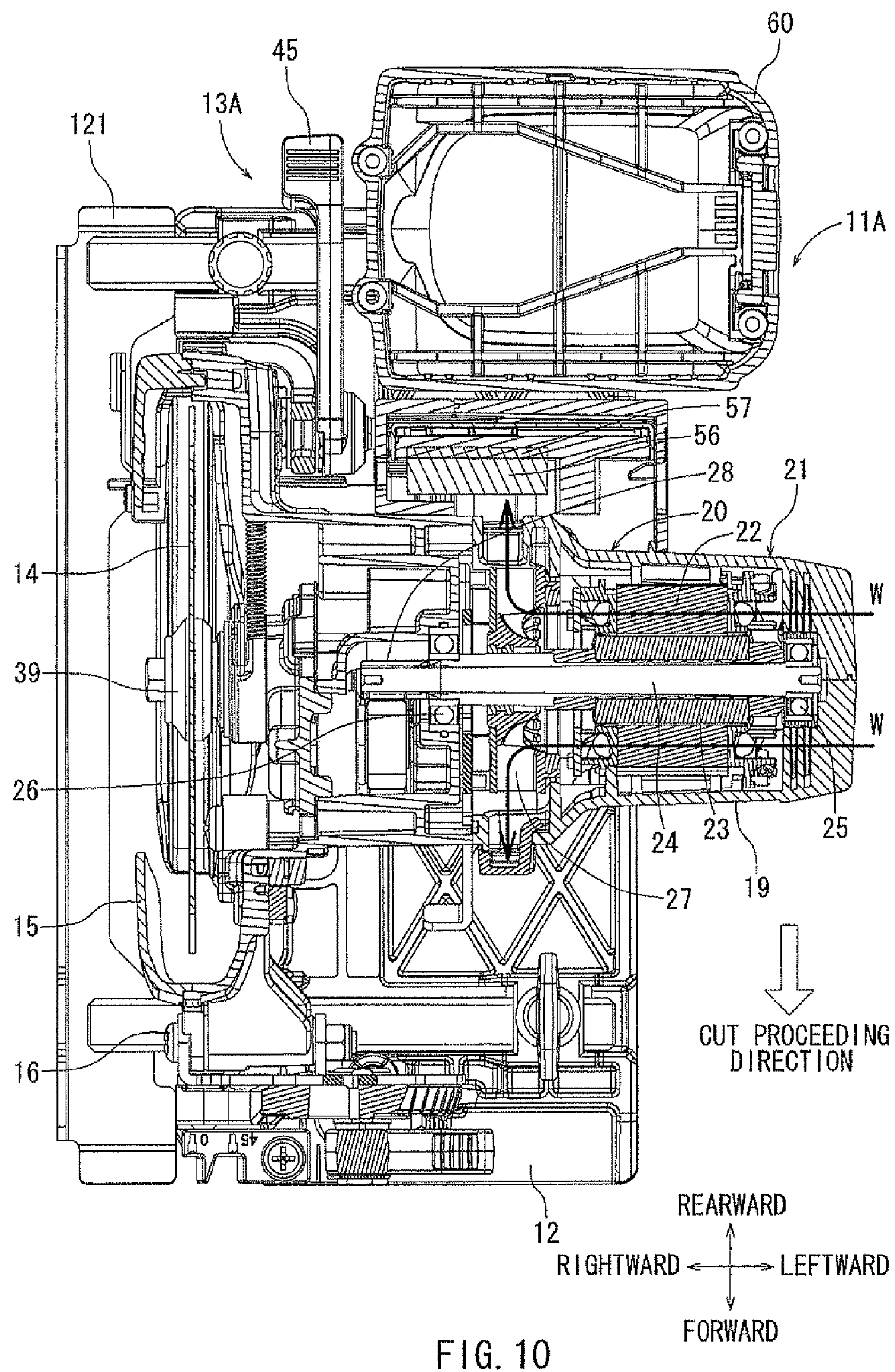
FIG. 10 is a sectional view taken along line X-X in FIG. 9 showing the internal structure of the cutting tool.

As shown in FIG. 8, a controller 56 for performing a rotational drive control of the electric motor 19 may be disposed within the handle 41A. The controller 56 may include various electric components mounted to a base member 57. The controller 56 including the base member 57 may be supported within the handle 41A. More specifically, the electric components of the controller 56 may include those serving as a normal controller for controlling the supply of electric power to the electric motor 19 and may also include those serving as an AS controller (auto-stop controller) for automatically stopping the supply of power when a predetermined condition has been satisfied. For example, the AS controller may forcibly stop the supply of power to the electric motor 19 when an over-discharge condition or an over-current condition has occurred to the battery pack 60 mounted to the battery mount portion 43.

More specifically, in this embodiment, the position of the controller 56 within the tool unit 13A may be set such that a front surface of the controller 56 extending in the longitudinal direction of the controller 56 is positioned on a radially outer side of the cooling fan 27. Therefore, air of one of air streams W produced by the cooling fan 27 may be applied to the front surface of the controller 56. In other words, the controller 56 may be positioned in a flow path of air discharged from the fan 27 after cooling the motor 19. In addition, the position of the controller 56 within the tool unit 13A may be set such that left and right end surfaces of the controller 56 extend along the work proceeding direction (i.e., the forward and rearward direction). Further, the controller 56 may be positioned on the rear side of the electric motor 19 in the work proceeding direction and may be positioned on the front side of the battery mount portion 43 in the work proceeding direction.

With the cutting tool 11A of the second embodiment, the motor shaft 24 and the output shaft 46 are positioned within the length of the handle 41A in the work proceeding direction. Therefore, the cutting tool 11A can be configured to be compact with respect to the cut proceeding direction. Hence, the cutting tool 11A can be improved in its operability. In addition, the motor shaft 24 and the output shaft 36 are positioned forwardly of the position 600 of the gravity center of the battery 60 with respect to the work proceeding direction, while the motor shaft 24 and the output shaft 36 are positioned within the range of length of the handle 41A as described above. Therefore, the cutting tool 11A may be improved in the weight balance with respect to the forward and rearward direction along the work proceeding direction. Therefore, the operability of the cutting tool 11A may be further improved. Further, the intermediate shaft 32 is positioned forwardly of the motor shaft 24 and the output shaft 36 in the work proceeding direction, while the intermediate shaft 32 is positioned rearwardly of the front end 52 of the slip-preventing cover 51 of the handle 41A with respect to the cut proceeding direction. Therefore, the weight balance with respect to the forward and rearward direction along the cut proceeding direction of the cutting tool 11A can be further improved.

Furthermore, the controller 56 is positioned within the tool body 13A such that the front surface of the controller 56 extending in the longitudinal direction of the controller 56 is positioned on the radially outer side of the cooling fan 27. Therefore, air discharged from the cooling fan 27 can be applied to the front surface of the controller 56 for cooling the controller 56. Hence, it is possible to cool the controller 56 by the cooling fan 27 without need of an additional cooling device, and it is possible to downsize the cutting tool 11A. In addition, because the controller 56 is positioned on the rear side of the electric motor 19 with respect to the work proceeding direction, the length of the cutting tool 11A with respect to the work proceeding direction can be minimized. Therefore, it is possible to further improve the operability of the cutting tool 11A. Further, the left and right end surfaces of the controller 56 are positioned to extend along the work proceeding direction. Therefore, it is possible to minimize the length of the space occupied by the controller 56 in the work proceeding direction. Hence, the size of the cutting tool 11A with respect to the cutting direction can be reduced also in this respect. As a result, the operability of the cutting tool 11A can be further improved.

Furthermore, in the second embodiment, the output shaft 36 is rotatably supported by three bearings 37, 381 and 382. Therefore, it is possible to support the output shaft 36 such that the center of rotation of the output shaft 36 can be maintained in stable in comparison with the arrangement where the output shaft 36 is supported by only two bearings. Hence, the output shaft 36 can be accurately rotatably supported while the cutting tool 11A can be downsized. In addition, the end portion of the output shaft 36 on the side of the saw blade 14 is supported by two ball bearings 381 and 382 that are arranged adjacent to each other. Therefore, the accuracy in the rotational support of the output shaft 36 can be improved, primarily for the end portion, to which the saw blade 14 is mounted. Further, the rotation of the electric motor 19 is reduced at two stages before it is transmitted to the output shaft 36. Therefore, it is possible to improve the accuracy in the rotational support of the output shaft 36, while the rotational torque can be increased by the reduction gear train. Further, the contact length 380 in the axial direction of the bearings 381 and 382 contacting with the output shaft 36 is set to be slightly longer than the contact length 370 in the axial direction of the bearing 37 contacting with the output shaft 36. Therefore, also in this respect, the accuracy in the rotational support of the output shaft 36 can be improved, primarily for the end portion, to which the saw blade 14 is mounted.

The above first and second embodiments may be modified in various ways. For example, in these embodiments, the slide rails 61 extend along the longitudinal direction L of the battery pack 60, and the battery pack 60 is mounted to be oriented laterally by moving the battery pack 60 to slid laterally along the battery mount portion 43 via the slide rails 61. However, it may be possible to arrange the slide rails 61 to extend along the widthwise direction S of the battery pack 60, and the battery pack 60 may be mounted to be oriented laterally by moving the battery pack 60 to slide in the longitudinal direction along the battery mount portion 43 via the rails 61. Also with this arrangement, it is possible to mount the battery pack 60 to be oriented laterally. Thus, the battery pack 60 may be mounted in the state that its widthwise direction S extends along the work proceeding direction. Therefore, the size of the rear portion of the handle 41 (41A) can be reduced with respect to the forward and rearward direction.

Further, although the longitudinal direction L of the battery pack 60 extends substantially perpendicular to the work proceeding direction when the battery pack 60 is mounted to be oriented laterally, it may be possible that the longitudinal direction L of the battery pack 60 is inclined by a small angle, i.e. an acute angle, relative to the direction perpendicular to the work proceeding direction.

Furthermore, although the output shaft 36 is rotatably supported by three bearings 37, 381 and 382, the output shaft 36 may be rotatably supported by four or more bearings. In the second embodiment, the bearing 37 is a needle bearing, and the bearings 381 and 382 are ball bearings. However, all the bearings 37, 381 and 382 may be ball bearings. I may be also possible that each of the bearings 37, 381 and 382 is any other type of bearings than the needle bearing or the ball bearing. However, it may be preferable that the bearings 381 and 382 on the side of the saw blade 14, i.e., a cutter, are ball bearings. In addition, the number of the bearings may not be limited. For example, three or more bearings may be provided on the side of the saw blade 14. Similarly two or more bearings may be provided on the side opposite to the saw blade 14. For example, it may be possible that the number of the bearings on the side opposite to the saw blade 14 may be larger than the number of the bearings on the side of the saw blade 14. Furthermore, although the rotation of the drive motor 19 is reduced at two stages by the intermediate gear 31 and the output gear 35, the rotation may be reduced at three or more stages.

Furthermore, although the electric components of the controller 56 may include those serving as a normal controller and those serving as an AS controller, the controller 56 may perform any other control as long as it relates to the rotational control of the electric motor 19.

Furthermore, although the portable cutting tool 11 (11A) has been described as an example of a cutting tool, the above teachings can also be applied to any other cutting tools, such as a jigsaw and a chainsaw used for cutting wooden materials, a disk grinder used for grinding stone materials or the like, and a trimmer and a router used for cutting end portions of wooden materials or forming grooves in wooden materials.

What is claimed is:

1. A hand-held cutting tool comprising:
- a tool unit including a handle and a battery pack, the handle being configured to be grasped by a user, and the battery pack serving as a power source;
- a blade defining a plane, the blade being rotatable in the blade plane;
- an electric motor configured to rotatably drive the blade and to receive a supply of an electric power from the battery pack;
- a base configured to be placed on a workpiece, the blade plane intersecting the base to define a cut axis extending in a work proceeding direction, the base having a front end and a rear end with respect to the work proceeding direction along which the cutting tool is moved for performing a cutting operation, the tool unit being vertically movable relative to the base; and
- a controller configured to control an operation of the electric motor, the controller being disposed on a rear side of the electric motor with respect to the work proceeding direction, wherein
- the battery pack is configured to be mounted to the handle and has a longitudinal dimension, a width dimension, and a depth dimension, the longitudinal dimension being greater than the width dimension,
- the handle has a rear portion with respect to the work proceeding direction, the rear portion of the handle extending rearward beyond the rear end of the base in the work proceeding direction,
- when the battery pack is mounted to the rear portion of the handle, at least a portion of the battery pack extends rearward beyond the rear end of the base in the work proceeding direction, and the longitudinal dimension of the battery pack extends in a first direction that is non-parallel with the work proceeding direction,
- the battery pack is mounted to and removed from a lower side of the rear portion of the handle by slidably moving the battery pack in a second direction along an opposed outer surface of the lower side of the rear portion of the handle, the outer surface facing the base,
- the first direction and the second direction are substantially perpendicular to the work proceeding direction,
- when the battery pack is mounted to the handle, a lateral side end portion of the width dimension of the battery pack in a direction opposite to the work proceeding direction extends rearward beyond the rear end of the base, and a longitudinal end portion of the battery pack in the second direction extends beyond a lateral side edge of the base in the second direction, and
- a majority of the controller is aligned with the electric motor and the battery pack in a front-rear direction of the cutting tool.

2. The hand-held cutting tool according to claim 1, wherein the cutting tool is a portable circular saw.

3. The hand-held cutting tool according to claim 2, wherein:
- the tool unit further includes a drive section located upwardly of the base;
- the handle is disposed on an upper side of the drive section; and
- the drive section includes:
  - the electric motor,
  - a first rotary shaft serving as an output shaft of the electric motor,
  - a motor gear rotatable with the first rotary shaft,
  - a first reduction gear engaging with the motor gear,
  - a second rotary shaft rotatable with the first reduction gear,
  - a second reduction gear rotatable with the second rotary shaft,
  - a third reduction gear engaging with the second reduction gear, and
  - a third rotary shaft rotatable with the third reduction gear.

4. The hand-held cutting tool according to claim 3, wherein the first rotary shaft and the third rotary shaft are located within a range of a length of the handle with respect to the work proceeding direction.

5. The hand-held cutting tool according to claim 3, wherein the first rotary shaft and the third rotary shaft are positioned forwardly of a center of gravity of the battery pack when the battery pack is mounted to the handle.

6. The hand-held cutting tool according to claim 3, wherein:

the second rotary shaft is positioned forwardly of both of the first rotary shaft and the third rotary shaft with respect to the word proceeding direction.

7. The hand-held cutting tool according to claim 6, further comprising a slip-preventing cover configured to cover an outer surface of the handle, wherein:

the slip-preventing cover has a front end with respect to the work proceeding direction; and the second rotary shaft is positioned rearwardly of the front end of the slip-preventing cover with respect to the work proceeding direction.

8. The hand-held cutting tool according to claim 1, wherein the battery pack includes slide rails, so that the battery pack is slid along the lower side of the rear portion of the handle via the slide rails.

9. The hand-held cutting tool according to claim 8, wherein the battery pack further includes:

a lock device configured to lock the battery pack against a mount portion provided at the rear portion of the handle; and a release button operable for releasing a lock condition of the battery pack against the mount portion, the release button being disposed at an end portion of the battery pack in a removing direction of the battery pack along the second direction.

10. The hand-held cutting tool according to claim 1, further comprising a battery mount portion, the battery mount portion having a first end and a second end in the second direction, the first end being substantially flush with the handle, and the battery mount portion protruding from the handle in the second direction, perpendicular to the work proceeding direction, such that the second end of the battery mount portion is spaced from the handle in the second direction.

11. The hand-held cutting tool according to claim 1, wherein the battery pack has a rear surface facing a direction opposite to the work proceeding direction and two opposite side surfaces perpendicular to the rear surface, and when the battery pack is mounted to the handle, the rear surface and the side surfaces of the battery pack are substantially exposed.

12. The hand-held cutting tool according to claim 1, wherein the battery pack has a rear surface facing the direction opposite to the work proceeding direction, and the handle has a rear surface facing the direction opposite to the work proceeding direction, and when the battery pack is mounted to the handle, the rear surface of the battery pack is substantially flush with the rear surface of the handle.

13. A hand-held cutting tool comprising:

a tool unit including a handle and a battery pack, the handle being configured to be grasped by a user, and the battery pack serving as a power source;

a blade defining a plane, the blade being rotatable in the blade plane; and a base configured to be placed on a workpiece, the blade plane intersecting the base to define a cut axis extending in a work proceeding direction, the base having a front end and a rear end with respect to the work proceeding direction along which the cutting tool is moved for performing a cutting operation, the tool unit being vertically movable relative to the base, wherein the battery pack is configured to be mounted to the handle and has a longitudinal dimension, a width dimension, and a depth dimension, the longitudinal dimension being greater than the width dimension, the handle has a rear portion with respect to the work proceeding direction, the rear portion of the handle extending rearward beyond the rear end of the base in the work proceeding direction, when the battery pack is mounted to the rear portion of the handle, at least a portion of the battery pack extends rearward beyond the rear end of the base in the work proceeding direction, and the longitudinal dimension of the battery pack extends in a first direction that is non-parallel with the work proceeding direction, the battery pack is mounted to and removed from a lower side of the rear portion of the handle by slidably moving the battery pack in a second direction along an opposed outer surface of the lower side of the rear portion of the handle, the outer surface facing the base, the first direction and the second direction are substantially perpendicular to the work proceeding direction, and when the battery pack is mounted to the handle, a lateral side end portion of the width dimension of the battery pack in a direction opposite to the work proceeding direction extends rearward beyond the rear end of the base, and a longitudinal end portion of the battery pack in the second direction extends beyond a lateral side edge of the base in the second direction, the cutting tool is a portable circular saw, the tool unit further includes a drive section located upwardly of the base;

the handle is disposed on an upper side of the drive section; and the drive section includes:

an electric motor configured to rotate by an electric power supplied from the battery pack;

a first rotary shaft serving as an output shaft of the electric motor;

a motor gear rotatable with the first rotary shaft;

a first reduction gear engaging with the motor gear;

a second rotary shaft rotatable with the first reduction gear;

a second reduction gear rotatable with the second rotary shaft;

a third reduction gear engaging with the second reduction gear; and a third rotary shaft rotatable with the third reduction gear, the first rotary shaft and the third rotary shaft are located within a range of a length of the handle with respect to the work proceeding direction, and the first rotary shaft and the third rotary shaft are positioned forwardly of a center of gravity of the battery pack when the battery pack is mounted to the handle, the cutting tool further includes a controller configured to control an operation of the electric motor, and a majority of the controller is aligned with the electric motor and the battery pack in a front-rear direction of the cutting tool.

14. The hand-held cutting tool according to claim 1, wherein:

the battery pack has a substantially rectangular parallelepiped shape and includes a front side surface, a rear side surface, a right side surface, a left side surface, an upper surface, and a lower surface, the lateral side end portion defines the rear surface facing the direction opposite to the work proceeding direction, the longitudinal end portion defines one of the right side surface and the left side surface, the upper surface opposes to the outer surface of the lower side of the rear portion of the handle, and the lower surface opposes to the base, the battery pack further includes a pair of slide rails disposed at the upper surface of the battery pack, so that the battery pack is slid in the second direction along the outer surface of the lower side of the rear portion of the handle via the pair of slide rails, when the battery pack is mounted to the handle, the battery pack is located on a rear side of the electric motor with respect to the work proceeding direction, while the rear surface and one of the right side surface and the left side surface being substantially exposed, and the controller includes a long side and a short side that extend substantially parallel to the work proceeding direction.

15. A hand-held cutting tool comprising:

a tool unit including a handle and a battery pack, the handle being configured to be grasped by a user, and the battery pack serving as a power source;

a blade defining a plane, the blade being rotatable in the blade plane;

an electric motor configured to rotatably drive the blade and to receive a supply of an electric power from the battery pack;

a base configured to be placed on a workpiece, the blade plane intersecting the base to define a cut axis extending in a work proceeding direction, the base having a front end and a rear end with respect to the work proceeding direction along which the cutting tool is moved for performing a cutting operation, the tool unit being vertically movable relative to the base; and a controller configured to control an operation of the electric motor, the controller being disposed on a rear side of the electric motor with respect to the work proceeding direction, wherein the battery pack is configured to be mounted to the handle and has a longitudinal dimension, a width dimension, and a depth dimension, the longitudinal dimension being greater than the width dimension, the handle has a rear portion with respect to the work proceeding direction, the rear portion of the handle extending rearward beyond the rear end of the base in the work proceeding direction, when the battery pack is mounted to the rear portion of the handle, at least a portion of the battery pack extends rearward beyond the rear end of the base in the work proceeding direction, and the longitudinal dimension of the battery pack extends in a first direction that is non-parallel with the work proceeding direction, the battery pack is mounted to and removed from a lower side of the rear portion of the handle by slidably moving the battery pack in a second direction along an opposed outer surface of the lower side of the rear portion of the handle, the outer surface facing the base, the first direction and the second direction are substantially perpendicular to the work proceeding direction, and a majority of the controller is aligned with the electric motor and the battery pack in a front-rear direction of the cutting tool.

16. The hand-held cutting tool according to claim 13, wherein:

the controller is disposed on a rear side of the electric motor with respect to the work proceeding direction.

17. The hand-held cutting tool according to claim 16, wherein:

the battery pack has a substantially rectangular parallelepiped shape and includes a front side surface, a rear side surface, a right side surface, a left side surface, an upper surface, and a lower surface, the lateral side end portion defines the rear surface facing the direction opposite to the work proceeding direction, the longitudinal end portion defines one of the right side surface and the left side surface, the upper surface opposes to the outer surface of the lower side of the rear portion of the handle, and the lower surface opposes to the base, the battery pack further includes a pair of slide rails disposed at the upper surface of the battery pack, so that the battery pack is slid in the second direction along the outer surface of the lower side of the rear portion of the handle via the pair of slide rails, when the battery pack is mounted to the handle, the battery pack is located on a rear side of the electric motor with respect to the work proceeding direction, while the rear surface and one of the right side surface and the left side surface being substantially exposed, and the controller includes a long side and a short side that extend substantially parallel to the work proceeding direction.

18. The hand-held cutting tool according to claim 16, wherein:

the blade is a circular saw blade;

the electric motor is a brush-less motor with a motor axis extending parallel to a rotational axis of the saw blade;

the controller has a rectangular shape in cross section with two opposite longer sides and two shorter sides connecting the two opposite longer sides; and when the battery pack is mounted to the handle, the longitudinal direction of the battery pack extends parallel to the two opposite longer sides of the controller.

19. The hand-held cutting tool according to claim 16, wherein:

when the battery pack is mounted to the handle, at least a part of the controller is positioned within the longitudinal dimension of the battery pack.

20. The hand-held cutting tool according to claim 16, wherein:

the two opposite longer sides of the controller extend substantially perpendicular to an extending direction of the base and parallel to the second direction.

21. The hand-held cutting tool according to claim 19, wherein:

the tool unit is configured such that a flow path of cooling air is defined in the tool unit for cooling the brush-less motor; and the controller is disposed in the flow path of the cooling air.

22. The hand-held cutting tool according to claim 15, wherein:

the battery pack has a substantially rectangular parallelepiped shape and includes a front side surface, a rear side surface, a right side surface, a left side surface, an upper surface, and a lower surface, the lateral side end portion defines the rear surface facing the direction opposite to the work proceeding direction, the longitudinal end portion defines one of the right side surface and the left side surface, the upper surface opposes to the outer surface of the lower side of the rear portion of the handle, and the lower surface opposes to the base, the battery pack further includes a pair of slide rails disposed at the upper surface of the battery pack, so that the battery pack is slid in the second direction along the outer surface of the lower side of the rear portion of the handle via the pair of slide rails, when the battery pack is mounted to the handle, the battery pack is located on a rear side of the electric motor with respect to the work proceeding direction, while the rear surface and one of the right side surface and the left side surface being substantially exposed, and the controller includes a long side and a short side that extends substantially parallel to the work proceeding direction.

23. The hand-held cutting tool according to claim 15, wherein:

the tool unit is configured such that a flow path of cooling air is defined in the tool unit for cooling the brush-less motor; and the controller is disposed in the flow path of the cooling air.

* * * * *